Sept. 10, 1940.  E. CHRISTIANSEN  2,214,523
DOUGH MOULDING OR BALLING MACHINE
Filed July 20, 1938

Ejnar Christiansen
Inventor
By
C. A. Snow & Co.
Attorneys.

Patented Sept. 10, 1940

2,214,523

UNITED STATES PATENT OFFICE 2,214,523

DOUGH MOULDING OR BALLING MACHINE

Ejnar Christiansen, Birmingham, England

Application July 20, 1938, Serial No. 220,387
In Great Britain July 22, 1937

2 Claims. (Cl. 74—600)

This invention relates to dough moulding or balling machines of the type in which a moulding cup or member is given an orbital movement over the pieces of dough to roll the same into a sphere. In this type of machine a moulding cup or a plurality of cups are carried by a frame mounted on a crank arm which is adjusted so that the cups are centrally over the piece of dough at the commencement and finish of the moulding action; the crank arm is carried on the spindle mounted eccentrically in a rotating head, and the spindle is rotated by the relative movement of the shaft driving and the rotating head, such head being raised and lowered to move the balling cups into and out of contact with the pieces of dough.

This invention has for its object improved means for effecting the relative axial movements of the rotating head and driving shaft and the simultaneous raising and lowering thereof.

In order that the invention may be clearly understood, and readily carried into effect reference may be had to the accompanying drawing on which:

Figures 1, 2:
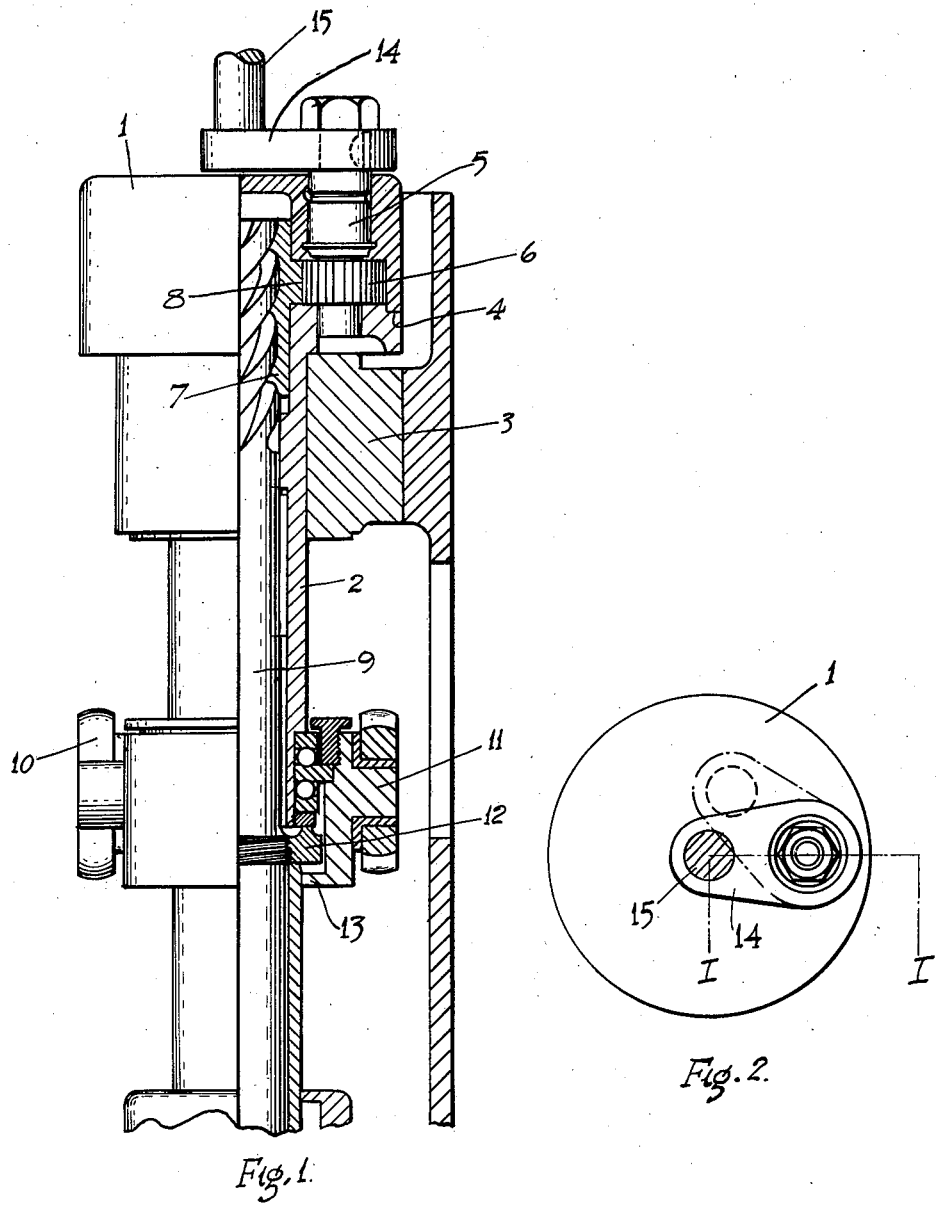
Figure 1 is an elevation with part in section on line 1—1 of Figure 2.
Figure 2 is a plan view of the rotating head shown by Figure 1.

According to a convenient embodiment of this invention, the rotary head 1 has a depending tubular extension or sleeve 2 which is mounted in a bearing 3 carried by the machine frame. The rotary head is divided at 4, at right angles to its axis, for assembling an eccentrically arranged crank arm spindle 5 which has a toothed wheel 6 thereon and also for assembling a gear sleeve 7 having a ring of teeth 8 thereon for engaging the toothed wheel 6 on the crank pin 5, the ring of teeth positioning the sleeve on the rotary head. A driving shaft or central spindle 9 is mounted in the sleeve 7 on the rotary head and is keyed thereto to permit of relative axial movement whilst the rotary head 7 and spindle 9 are rotating. The driving shaft is driven by a suitable gearing mounted in a stationary gear box, the spindle being capable of moving axially therein whilst being driven.

The rotary head 1, whilst rotating with the shaft 9, is raised and lowered by means of a cam actuated lever 10 which is connected to a control ring 11 mounted in ball bearing around the bottom of the tubular extension or sleeve 2 on the rotary head. When therefore the control ring is raised, the rotary head is raised and the engagement of the helical threaded sleeve 7 with the driving shaft or central spindle 9 causes the crank arm to be moved inwardly so that the frame ceases to have an orbital movement. The upward movement of the rotary head alone is comparatively small after which the rotary head and driving shaft are raised simultaneously. Conveniently for this purpose a shoulder or ring 12 on the spindle is engaged by a flange 13 on the control ring, the flange on the control ring being offset the required distance to permit of the movement of the rotary head to give the crank adjustment. On the downward movement of the control ring the driving shaft or central spindle and rotary head will move in unison until the driving shaft reaches its initial position, and on the further continued downward movement of the control ring the rotating head moves axially on the driving shaft, thereby adjusting the crank arm 14 to give the orbital movement. The crank arm 14, carries a pin 15 which carries the usual frame incorporating the balling cups, and such frame is mounted on two devices as illustrated, one on each side of the machine. When the pin 15 is coaxial with the spindle 9, the balling cup is stationary.

I claim:

1. An adjustable crank mechanism comprising a crank arm on which a crank pin is mounted, a spindle carrying the said crank arm, a rotating head in which said spindle is eccentrically mounted, a driving shaft on which said rotary head is slidably but non-rotatably mounted, a sleeve mounted in the rotary head and having internal helical teeth which engage helical teeth on the driving shaft and also having external gear teeth which engage gear teeth on the crank arm spindle, means for raising the rotary head on the driving shaft to turn the spindle carrying the crank arm through the medium of the said sleeve and toothed gearing and which means afterwards simultaneously raise the rotating head and the driving shaft, the latter means being such that upon the reversed movement, the rotating head and the driving shaft are simultaneously lowered until the driving shaft is in its initial position and on the continued movement of the rotating head to its initial position, the spindle carrying the crank arm is turned.

2. An adjustable crank mechanism, comprising a crank arm carrying a crank pin, a spindle carrying the said crank arm, a rotating head in which said spindle is eccentrically mounted, a vertically slidable driving shaft on which said rotating head is slidably but non-rotatably mounted so that the spindle can be moved axially in relation to the head, a sleeve mounted in the rotary head and having internal helical teeth which engage helical teeth on the driving shaft and also having external gear teeth which engage gear teeth on the crank arm spindle so that relative axial movement causes the said spindle to rotate to adjust the crank arm, a stationary member for supporting the rotary head in the lowered position, a sleeve on the said rotary head, a control ring on the sleeve by means of which the head is raised or lowered, a projection on the control ring which is adapted to engage a projection on the driving shaft and so arranged that when the control ring is raised the rotating head is raised on the driving shaft to adjust the crank arm, after which the further raising of the control ring simultaneously lifts the driving shaft and rotating head, and on the lowering movement of the control ring the driving shaft and rotating head are lowered together until the driving shaft reaches its lowered position after which the head is lowered on the shaft to adjust the crank arm.

EJNAR CHRISTIANSEN.